C. WIEBKE.
BRAKE FOR TRUCKS.
APPLICATION FILED OCT. 31, 1907.

917,392. Patented Apr. 6, 1909.

Witnesses
Bernard Cowen
Wm. Ashley Kelly

Inventor
Charles Wiebke
by Henry D. Williams
Attorney.

UNITED STATES PATENT OFFICE.

CHARLES WIEBKE, OF NEWARK, NEW JERSEY.

BRAKE FOR TRUCKS.

No. 917,392.  Specification of Letters Patent.  Patented April 6, 1909.

Application filed October 31, 1907. Serial No. 400,078.

*To all whom it may concern:*

Be it known that I, CHARLES WIEBKE, a citizen of the United States, residing at Newark, in the county of Essex and State of New Jersey, have invented a certain new and useful Improvement in Brakes for Trucks, of which the following is a specification, reference being had therein to the accompanying drawings, forming part thereof.
Certain textile and other machines, such, for example, as textile twisting machines, are mounted upon wheeled trucks to permit them to be moved about the floor of the workroom in the course of their operations.
In using the twisting operation, however, it is necessary to prevent movement of the truck by the pull of the threads, and the object of the present invention is to produce a simple and reliable brake by which a wheeled truck of any character may be positively prevented from moving in one direction when the brake is in operative position.

The invention comprises, broadly, a chock adapted to enter the angle between the floor and a wheel rim and to simultaneously engage the floor and the wheel rim, together with improved means for moving and holding the chock out of operative position.
The invention comprises, further, the use of two chocks operating on the front and rear wheels respectively and connected together so as to move simultaneously into and out of operative position.
I will now describe the embodiment of my invention illustrated in the accompanying drawings, and will thereafter point out my invention in claims.

Figure 1:
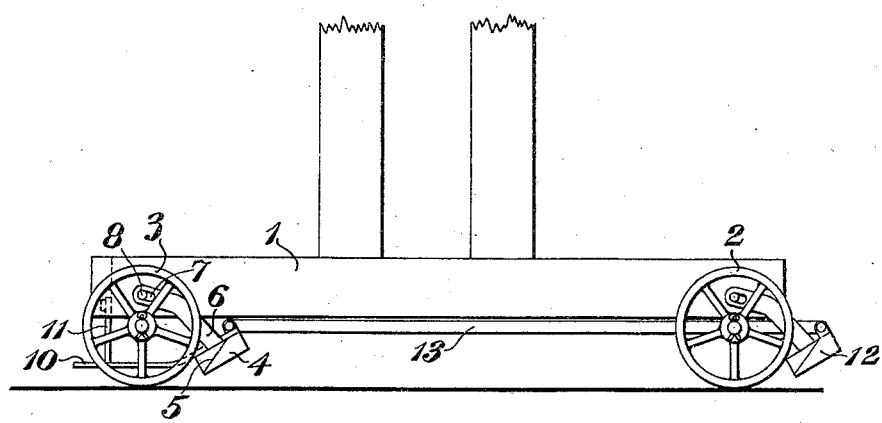
Figure 2:
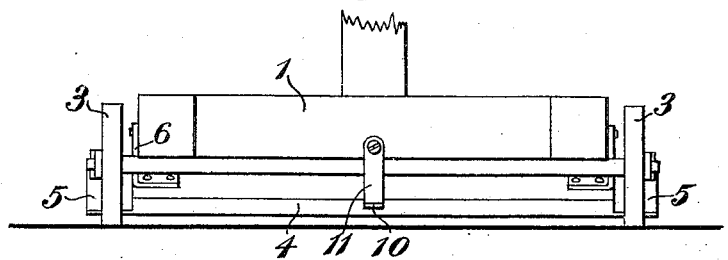
Figure 3:
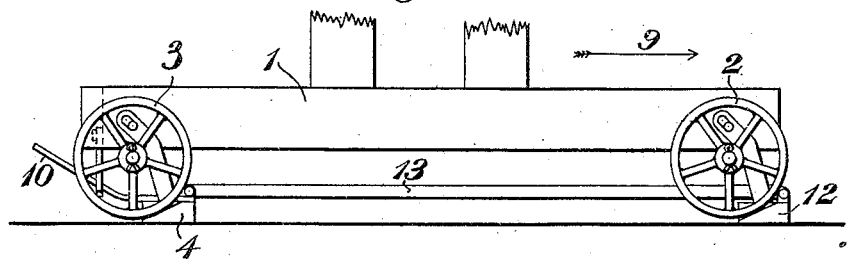

In the drawings Figure 1 is a side elevation of a truck embodying the present invention, showing the brake in inoperative position. Fig. 2 is a rear elevation of the same. Fig. 3 is a side elevation showing the brake in operative position.
The illustrated embodiment of the invention comprises a truck 1 provided with front wheels 2 and rear wheels 3. In front of the rear wheels is suspended a chock 4 consisting of a transverse bar, which is provided at its ends with inclined upper surfaces 5. The chock 4 is secured to upwardly extending arms 6 which have slots 7 in their upper ends engaging pins 8 on the truck. When the chock is permitted to swing under the influence of gravity its ends enter the angles between the floor and the rims of the wheels 3, and the chock engages the floor and the wheel rims simultaneously. If now the truck begins to move forwardly in the direction of the arrow 9, Fig. 3, the wheels at once mount on the chock, the slots 7 permitting the necessary vertical movement of the truck, so that the wheels are disengaged from the floor and the weight of the truck is borne by the chock, which remains firmly fixed on the floor and prevents further movement of the truck. To prevent the chock from moving so far to the rear as to permit the wheels to ride over it, the chock is suspended so that the arm 6, in its non-operative position, will be slightly in advance of the wheel axle and in its operative position will engage the axle to limit the rearward movement of the chock. The truck may be freely moved backwardly, however, the chock, in such case, swinging freely back out of operative position. In order to permit the truck to be moved forward when necessary, means are provided for throwing the chock out of operation. A foot lever 10 is fixed to the chock and extends to the rear of the truck. When the lever is depressed by the foot of the operator the chock is swung back out of contact with the floor and the wheels. A retaining device is provided, consisting of a latch 11 pivoted at its upper end to the truck and adapted to be swung into operative position over the lever 10 when the lever is depressed, so as to hold the chock in inoperative position. In the illustrated embodiment of the invention, a second chock 12 is provided for the front wheels 2 of the truck, this chock being supported on the truck in the same manner as the chock 4. A link 13 connects the two chocks and constrains them to move simultaneously into and out of operative position.

The invention is adapted for use on any machine or wheeled vehicle of which it is desirable to limit positively the movement in one direction, and it is obvious that various modifications may be made in the construction shown and hereinbefore specifically described within the spirit and scope of the invention as defined in the following claims.

I claim:—

1. A brake for machine trucks comprising, in combination with a wheeled truck, two chocks adapted to enter, respectively, the angles between the floor and the front and rear wheel rims, and to engage the floor and the wheel rims simultaneously, fixed means for limiting the movement of the chocks and connection between the chocks whereby they are constrained to move simultaneously into and out of operative position.

2. A brake for machine trucks comprising, in combination with a wheeled truck, a chock adapted to enter the angle between the floor and the rims of a pair of wheels and to engage the floor and the rims of the wheels when the truck moves in one direction, connections between the chock and the truck including an arm pivoted to the truck in position to engage the axle of the wheels and limit the movement of the chock, and means for throwing the chock out of operative position to release the truck.

3. A brake for machine trucks comprising, in combination with a wheeled truck, a chock adapted to enter the angle between the floor and the rim of a wheel and to engage the floor and said rim in front of the wheel when the truck moves in one direction, connection between the chock and the truck comprising an arm pivoted to the truck, and a foot lever connected with the chock and extending at the rear of the truck, the foot lever being arranged and operating, when it is depressed, to throw the chock out of operative position to release the truck.

In testimony whereof I affix my signature in presence of two witnesses.

CHARLES WIEBKE.

Witnesses:
BERNARD COWEN,
MARGARET BEST.